United States Patent [19]

Ohtsuka et al.

[11] 4,271,465
[45] Jun. 2, 1981

[54] INFORMATION HANDLING UNIT PROVIDED WITH A SELF-CONTROL TYPE BUS UTILIZATION UNIT

[75] Inventors: Toshinori Ohtsuka; Takashi Toyohuku, both of Tokyo, Japan

[73] Assignee: Nippon Electric Co., Ltd., Tokyo, Japan

[21] Appl. No.: 948,272

[22] Filed: Oct. 3, 1978

[30] Foreign Application Priority Data

Oct. 3, 1977 [JP] Japan .............................. 52-118879

[51] Int. Cl.³ .............................................. G06F 3/04
[52] U.S. Cl. ................................................ 364/200
[58] Field of Search ... 364/200 MS File, 900 MS File; 340/147 LP

[56] References Cited

U.S. PATENT DOCUMENTS

| | | | |
|---|---|---|---|
| 3,237,164 | 2/1966 | Evans | 364/200 X |
| 3,242,467 | 3/1966 | Lamy | 364/200 |
| 3,425,037 | 1/1969 | Patterson et al. | 364/200 |
| 3,470,542 | 9/1969 | Trantanella | 364/200 X |
| 3,668,651 | 6/1972 | Hornung | 364/200 |
| 3,710,324 | 1/1973 | Cohen et al. | 364/200 |
| 3,800,287 | 3/1974 | Albright | 364/200 |
| 3,818,447 | 6/1974 | Craft | 364/200 X |
| 3,832,692 | 8/1974 | Henzel et al. | 364/200 |
| 3,866,181 | 2/1975 | Gayman et al. | 364/200 |
| 3,886,524 | 5/1975 | Appelt | 364/200 |
| 3,911,409 | 10/1975 | Kowal et al. | 364/200 |
| 3,983,540 | 9/1976 | Keller et al. | 364/200 |
| 4,096,569 | 6/1978 | Barlow | 364/200 |
| 4,096,572 | 6/1978 | Namimoto | 364/200 |
| 4,153,934 | 5/1979 | Sato | 364/200 |
| 4,156,277 | 5/1979 | Seitz et al. | 364/200 |
| 4,209,838 | 6/1980 | Alcorn, Jr. et al. | 364/200 |

*Primary Examiner*—Melvin B. Chapnick
*Attorney, Agent, or Firm*—Sughrue, Rothwell, Mion, Zinn and Macpeak

[57] ABSTRACT

A plurality of information handling units communicate asynchronously via a common bus using a single signal line. Each information handling unit includes a self-control type bus utilization unit connected to the signal line and operative to connect the common bus to an internal bus of the information handling unit. This unit includes an own name address generator responsive to a bus request signal for outputting the address of the information handling unit, the address being encoded according to that information handling unit's priority among the plurality of information handling units. Transmission gates couple the address to the common bus, and a decision unit compares a signal on the common bus and the address to make a decision based on the assigned priority of the information handling unit to derive a bus grant signal. This signal and a bus available signal on the single signal line are used to derive a signal to drive transmission gates that couple the common bus to the internal bus.

9 Claims, 5 Drawing Figures

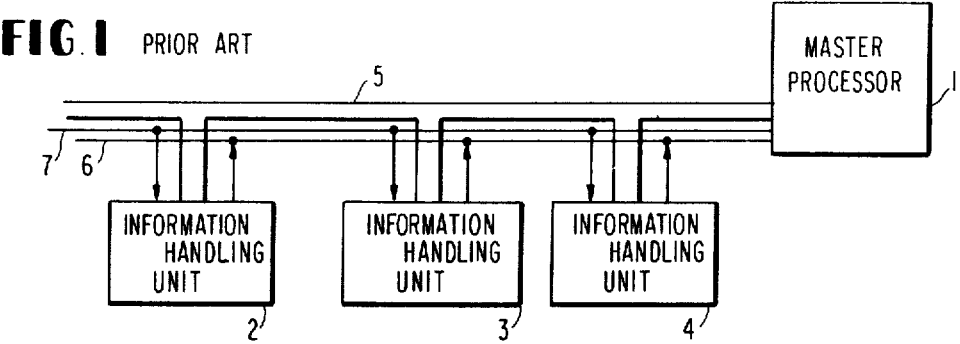
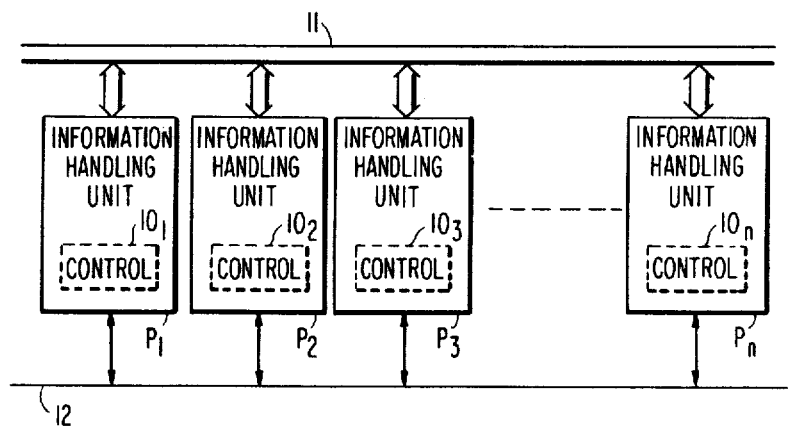
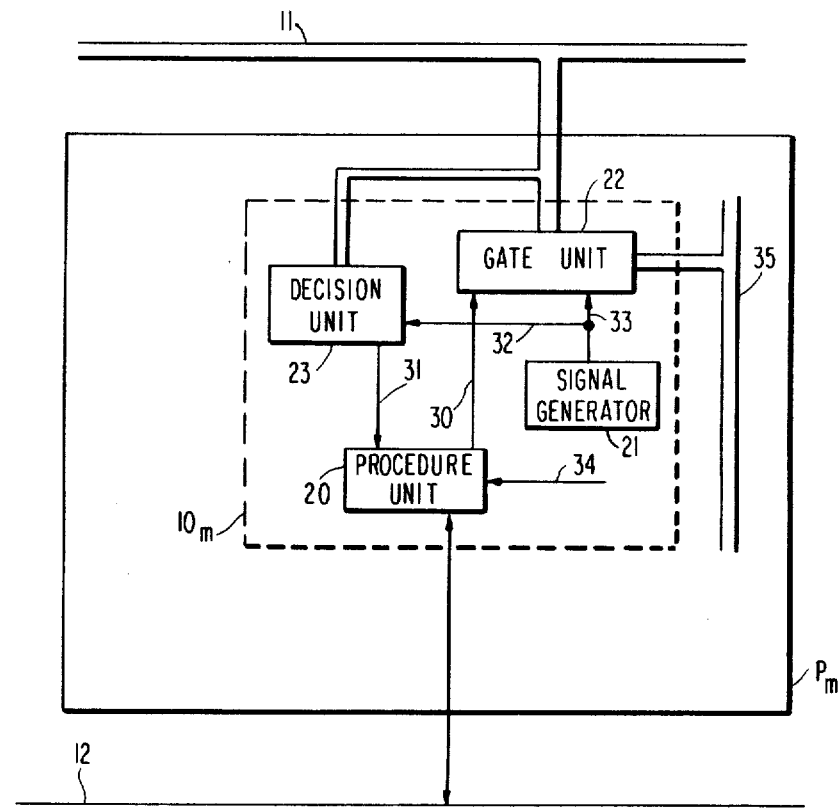

INFORMATION HANDLING UNIT PROVIDED WITH A SELF-CONTROL TYPE BUS UTILIZATION UNIT

BACKGROUND OF THE INVENTION

The present invention relates to an information handling unit, and more particularly, to an information handling unit constructed in such manner that a plurality of such information handling units may achieve information transfers therebetween through one common bus. Here, the term "information handling unit" designates generally every unit having the capabilities of transmitting program execution commands, instruction data or information data from one unit to another, or receiving them from another control system, and, more particularly, designates a processing unit, a control unit, an input/output unit, a memory unit or a combination of them, etc.

In the case where one of such information handling units achieves data transfer to or from another unit, a system comprising a plurality of information handling units has been widely employed in which data transfers are achieved by means of one common bus connecting the information handling units with each other. With regard to the procedure for utilizing the common bus in such a case, the heretofore most generally employed arrangement is as disclosed in U.S. Pat. No. 3,710,324, in which an information handling unit which wants to achieve data transfer by means of the common bus sends out a bus request signal (BR) through a bus request signal line to a bus control unit (called "processor unit" in the U.S. patent) which always supervises the state of utilization of the common bus, and in which the information handling unit was allowed to utilize the bus when it received a bus grant signal (BG) from the bus control unit, through a bus grant signal line.

In such a prior art system, however, because the bus control was performed by a single bus control unit, the system of the information handling units required two bus control lines, i.e. a bus request signal line and a bus grant signal line provided between each information handling unit and the bus control unit. This resulted in a disadvantage that the number of control lines was increased. Especially, in case where the respective information handling units are respectively formed of a monolithic integrated circuit, another disadvantage arises in that the number of external terminals of the integrated circuit is increased.

Furthermore, the bus control unit uses a timing clock to control the bus operation as a sequence of detection of bus request signals in order to select the highest priority processor and apply the bus grant signal to the highest priority processor. Therefore, the bus control needed a long processing time. This long processing time was serious in the case where a plurality of information handling units may simultaneously issue bus request signals to the bus control unit. This requires the bus control unit to select one information handling unit according to priority resulting in the processing speed of the information handling unit being unnecessarily lowered.

Still further, in the case where the aforementioned system is employed, timing must be synchronized between the respective information handling units and the bus control unit, so that a timing signal line is necessitated in addition to the two bus control lines, and an information handling unit cannot start data transfer using the bus until a timing signal is supplied thereto. This brings about another disadvantage in that the data transfer speed is further lowered.

In addition, in some cases, in order to establish priority, different circuit designs are required for the respective information handling units, and this degrades mass-producibility, imparts unnecessary limitations to information handling units which can be practically equipped, and thus lowers a versatility of the information handling units.

SUMMARY OF THE INVENTION

Therefore, it is a principal object of the present invention to provide an information handling unit which can complete a bus utilization procedure within a very short period of time.

Another object of the present invention is to provide an information handling system comprising a plurality of information handling units in which the number of signal lines for bus utilization interconnecting the information handling units is reduced to one with all the information handling units being identical to each other.

Another object of the present invention is to provide an information handling unit which is excellent in mass-producibility and versatility.

Still another object of the present invention is to provide an information handling unit which can achieve a bus utilization procedure in an asynchronous manner without being restrained by a timing signal, and which can determine the state of utilization of a bus by itself.

A basic construction of the information handling unit according to the present invention comprises a predetermined number of common bus terminals, a terminal coupled to a bus utilization signal line, an internal bus, and signal generator means generating a predetermined signal. First gate means leads the predetermined signal to the common bus and, a means is provided for comparing the signal on the common bus and the predetermined signal. First means generates a bus request signal, and second means generates a first signal when the bus request signal generating means generates the bus request signal while no bus utilization signal is on the bus utilization signal line. Second gate means transfers an information from the internal bus to the common bus terminal. Third means controls the second gate means when the signal on the common bus coincides with the predetermined signal. The comparing means is preferably designed to search by the signal on the common bus if the handling unit having a higher priority than itself requests a common bus utilization, and derive an output when no handling unit having a higher priority than itself requests the common bus utilization.

In the above-featured information handling unit according to the present invention, if one information handling unit coupled to a common bus is utilizing the bus at the common bus utilization request time, a bus utilization signal on the bus utilization signal line informs the other information handling unit, and the respective second means in the other information handling unit does not provide an output. As a result, each of the other information handling units is inhibited from utilizing the common bus, while the information handling unit that is currently utilizing the common bus can execute data transfer without being hindered by the other information handling units.

When the common bus is not utilized, if one information handling unit issues a bus utilization request, the predetermined signal is supplied from the signal generator means to the common bus and the comparing means, where this predetermined signal and a signal inputted thereto via the common bus are compared. If any signal is not outputted from another information processor onto the common bus at this moment, then a first signal is fed from the comparing means to the third means, to grant a utilization of the common bus and to allow data to be transferred from the internal bus to the common bus by closing the second gate means. On the other hand, if a different signal or signals are simultaneously outputted from another information handling unit or other information handling units onto the common bus, the comparing means searches to determine if the information handling unit having higher priority than itself requests bus utilization by a signal on the common bus, and thereby the right to utilize the common bus is granted only to one information handling unit having the highest priority.

As described above, according to the present invention, in a system in which a plurality of information handling units execute data transfer with each other by means of a common bus, each information handling unit can make a decision by itself on whether or not it is granted the right to utilize said common bus, and also it can control itself according to the decision. For that purpose there is no need for a centralized bus control unit, nor is it necessary that a right for utilization of the common bus be determined according to a predetermined timing signal. Furthermore, according to the present invention, hardware for forming the information handling unit is also easily designed, and since only one single common bus utilization signal line is necessitated, the circuit pattern can be extremely simplified. In addition, since the respective information handling units comprise the same data transfer mechanism and the same control mechanism therefor, they can execute data transfer at an arbitrary time, if desired, without being restrained by a master processor, and thereby the data transfer speed can be greatly enhanced. Thus, according to the present invention, a particular operation can be achieved with an extremely simple construction, and very great advantages can be expected therefrom.

BRIEF DESCRIPTION OF THE DRAWINGS

The above-mentioned and other objects and advantages of the present invention will become more apparent by reference to the following description taken in conjunction with the accompanying drawings, in which:

FIG. 1 is a block diagram showing a plurality of information handling units in the prior art as connected to a common bus;

FIG. 2 is a block diagram showing a plurality of information handling units according to the present invention as coupled to a common bus;

FIG. 3 shows a functional block diagram of one preferred embodiment of the information handling unit according to the present invention;

DESCRIPTION OF THE PRIOR ART

Figure 4:
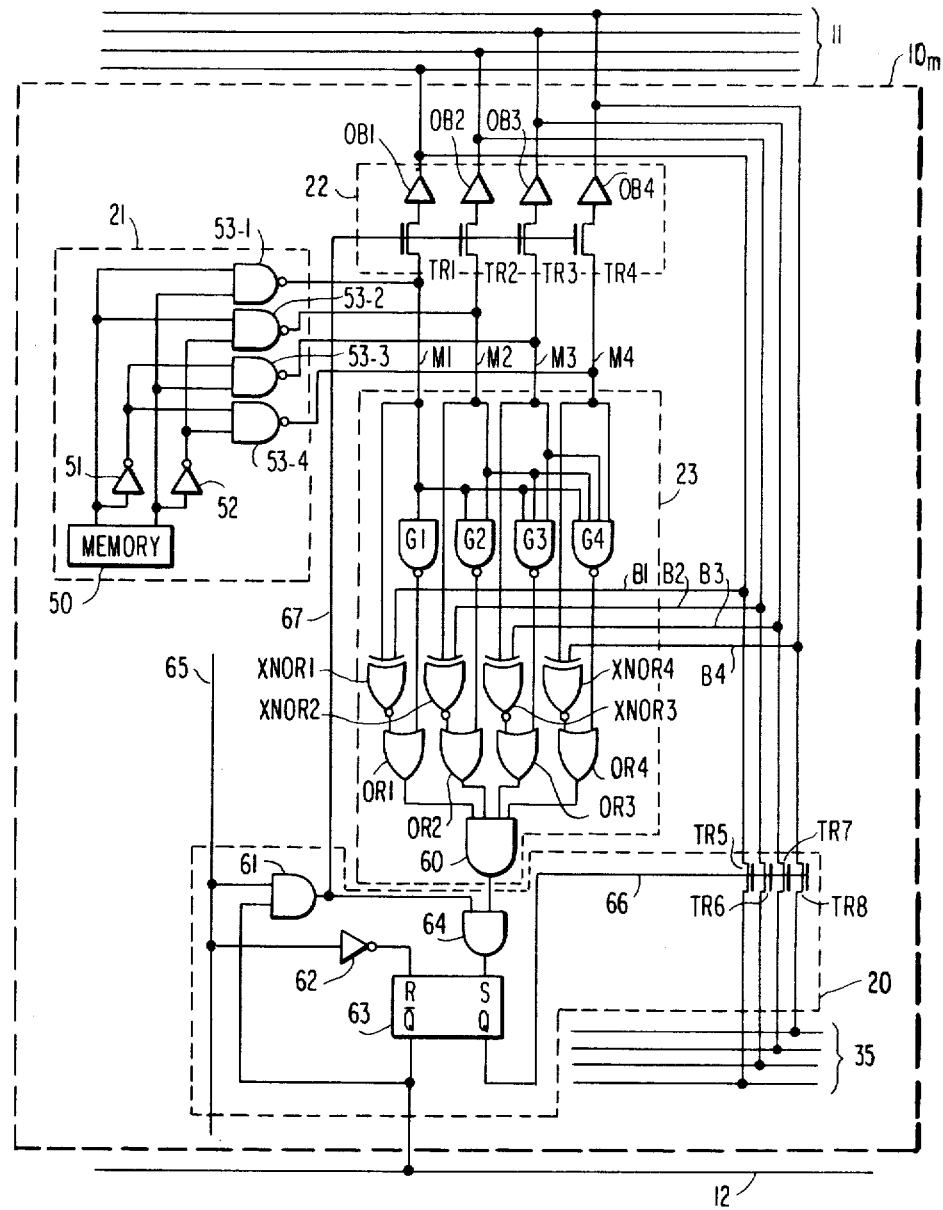
FIG. 4 is one example of a circuit diagram showing the functional block diagram in FIG. 3 in greater detail.

In the case of the conventional information handling units, as shown in FIG. 1, the respective information handling units 2, 3 and 4 are connected to a common bus 5 in parallel to each other, there is provided a master processor 1 for supervising data transfers between these information handling units, and with regard to utilization of the common bus 5 the respective information handling units are controlled by the master processor 1 via a bus request signal line 6 and a bus grant signal line 7. For instance, when the information handling unit 3 requests to utilize the common bus 5, it transmits a bus request signal to the master processor 1. In response to this signal, if the common bus 5 is idle, the master processor 1 sends a bus grant signal to that information handling unit 3, but if the common bus 5 is busy, it sends a busy signal to the information handling unit 3 to inhibit the common bus utilization thereof. In other words, each information handling unit can make data transfer to another information handling unit via the common bus 5 only when a bus grant signal is given by the master processor 1. Furthermore, such a procedure for utilization of the common bus had to be executed under control of a predetermined timing signal, and so, the access time in the information handling units from the bus request until the data transfer became possible, was unnegligibly long. Still further, each information handling unit 2, 3 or 4 necessitated two signal lines, that is, a bus request signal line 6 and a bus grant signal line 7, and especially in case where each information handling unit was made of a monolithic integrated circuit, there was an extremely unfavorable shortcoming that the number of external terminals was increased. In addition, in the case where bus requests were issued simultaneously from the respective information handling units 2, 3 and 4, the master processor had to select by itself which information handling unit could utilize the common bus with preference, and even the information handling unit having the highest preference had to wait until the selection routine of the master processor 1 was completed. Furthermore, with regard to the reference for decision of preference, various methods have been proposed such as a method in which a higher preference is imparted to an information handling unit placed nearer to the master processor, or a method in which different timing pulses are sent to the respective information handling units and different preferences are given to these timing pulses. However, in the former case, the number of the information handling units that can be connected to the common bus was limited by the capability of the master processor, whereas in the latter case there was a shortcoming that the information handling unit was unreasonably complex because of the necessity for a timing pulse generator and a receiver for the timing pulses, and after all, either proposal was unsatisfactory in view of versatility, manufacturing cost, reliability, etc. of the information handling unit.

Also in the prior art, it has been proposed that the bus control unit in the main processor be connected to the respective information handling units by a bus utilization request signal line and a bus utilization grant signal line. However, the number of the bus utilization request and grant lines is increased when the number of the information handling units is increased. In the case where each information handling unit is formed in one monolithic integrated circuit, a serious defect arises in that a great number of lead terminals is necessitated due to the increased number of bus utilization request and grant lines.

DESCRIPTION OF THE PREFERRED EMBODIMENT

Now referring to FIG. 2, the system comprising a plurality of information handling units according to present invention is described.

In each of any arbitrary number of information handling units $P_1$, $P_2-P_n$ coupled to a common bus 11 in parallel to each other is contained a self-control type bus utilization unit $10_1$, $10_2-10_n$, which can independently achieve selection of priority and control of the bus utilization by itself based on whether utilization of the bus is to be granted or to be inhibited. A single signal line 12 for informing the state of utilization of the common bus to the respective information handling units, is coupled to the respective information handling unit. With regard to the self-control type bus utilization units $10_1$, $10_2-10_n$ in the respective information handling units, the internal circuit of the unit will be understood by reference to FIG. 3.

In FIG. 3, an information handling unit Pm has a self-control type bus utilization unit 10m framed by a dotted line. More particularly, this unit 10m comprises a signal generator 21 for outputting a predetermined signal (in the illustrated embodiment, the predetermined signal formed by coding its own name address) upon occurrence of a bus request. Practically, this consists of a name address memory section and a name address decoder section and outputs a coded name address signal upon generation of a bus request signal. A gate unit 22 outputs this coded name address signal to a common bus 11. A decision unit 23 makes a decision on the coded name address signal and a signal inputted from the common bus 11 according to a predetermined law and outputs the results of the decision. In the illustrated embodiment, there is presented a unit including a comparator for comparing the two signals and outputting a signal only when both of the signals coincide with each other, and also having the capability of identifying a sequence of preference as a reference for the decision. A bus utilization procedure unit 20 accepts upon generation of a bus request signal 34 within the information handling unit, the bus request signal 34 and opens the gate unit 22 to lead a name address 33 to the common bus 11, if the signal on a bus utilization signal line 12 indicates that the common bus can be utilized, and makes a decision on whether or not an internal bus 35 is to be electrically coupled to the common bus 11 depending upon the output state of a coincidence signal 31 from the decision unit 23. In the illustrated embodiment, the unit is designed in such a way that when a coincidence signal 31 has been outputted, a decision is made that a request for utilization of the bus has been granted, so that the internal bus 35 is coupled to the common bus 11 and a bus busy signal is outputted on the bus utilization state signal line 12. In other words, when the information handling unit Pm issues a bus request signal 34, if the signal state on the bus utilization signal line 12 indicates a busy state, the bus request signal 34 is not led to the bus utilization procedure unit 20. By disconnecting the common bus 11, it will not hinder data transfer of another information handling unit. On the other hand, if the bus utilization signal line 12 indicates an idle state, then the bus request signal 34 is accepted, examination of a sequence of preference is commenced, and as a result when a preference has been acknowledged for that bus utilization unit 10m, the common bus 11 is coupled to the internal bus 35, data is transferred from a data transfer unit (not shown), and a bus busy signal is sent out on the bus utilization signal line 12 to inhibit utilization of the common bus 11 by another information handling unit.

With reference to FIG. 4, the operation of the information handling unit in the illustrated embodiment will be better understood and also the effects and advantages of the present invention will become more apparent.

FIG. 4 shows in greater detail one example of the circuit constructions of the respective functional blocks in the self-control type bus utilization unit 10m contained in the information handling unit Pm shown in FIG. 3.

A signal generator section 21 includes a memory section 50 which stores its own name address (in the illustrated embodiment, constructed of two memory circuits in each of which a binary signal of "1" or "0" is preset) and a decoder section consisting of NAND gates 53-1, 53-2, 53-3 and 53-4 receiving all possible combinations of signals consisting of positive logic signals from the respective memory circuits and negative logic signals passed through inverters 51 and 52 inputted thereto, and outputting a coded name address signal onto signal lines $M_1$, $M_2$, $M_3$ and $M_4$.

A gate unit 22 comprises a transmission gate section which has its transmission gates $TR_1$, $TR_2$, $TR_3$ and $TR_4$ opened in response to a bus request signal 65 when the common bus 11 is idle and transmits name address signals $M_1$, $M_2$, $M_3$ and $M_4$ onto the corresponding signal lines in the common bus 11. The gate unit 22 also includes and a buffer section consisting of buffer amplifiers $OB_1$, $OB_2$, $OB_3$ and $OB_4$.

On the other hand, a decision circuit 23 receiving the name address signals $M_1$, $M_2$, $M_3$ and $M_4$ inputted thereto comprises NAND gates $G_1$, $G_2$, $G_3$ and $G_4$ which have $M_1$, $M_1M_2$, $M_1M_2M_3$ and $M_1M_2M_3M_4$, respectively, inputted thereto. EXCLUSIVE-NOR gates $XNOR_1$, $XNOR_2$, $XNOR_3$ and $XNOR_4$ respectively receive the name address signals $M_1$, $M_2$, $M_3$ and $M_4$ and the corresponding signals $B_1$, $B_2$, $B_3$ and $B_4$ fed from the common bus 11 inputted thereto. The respective corresponding outputs of the NAND gates $G_1$, $G_2$, $G_3$ and $G_4$ and the EXCLUSIVE-NOR gates $XNOR_1$, $XNOR_2$, $XNOR_3$ and $XNOR_4$ are inputted to OR gates $OR_1$, $OR_2$, $OR_3$ and $OR_4$, respectively, and the four outputs from these OR gates $OR_1$, $OR_2$, $OR_3$ and $OR_4$ are inputted to an AND gate 60.

A bus utilization procedure circuit 20 comprises an AND gate 61 receiving the bus request signal on line 65 generated in that information handling unit Pm and a bus utilization signal inputted thereto from the bus utilization signal line 12 and outputs a bus available signal on line 67 only when both the signals are "1"-level signals. Another AND gate 64 compares the output states of said AND gate 61 and the AND gate 60 connected in the output stage of the decision unit 23 with each other, and sets means for outputting a bus grant signal on line 66 for a predetermined period of time only when both the output states are "1"-signals. In the illustrated embodiment, a flip-flop circuit 63 is employed as that means set by AND gate 64. When a signal is outputted from the AND gate 64, the flip-flop circuit 63 is set to output a bus grant signal on to the line 66 from its output terminal Q, and the bus grant signal on the line 66 opens gates $TR_5$, $TR_6$, $TR_7$ and $TR_8$ provided between an internal bus 35 and the common bus 11. During the period when the information handling unit Pm is carrying out data transfer by making use of the common bus 11, a bus busy signal (in the illustrated embodiment, a "0"-level signal) is outputted from the other output terminal $\overline{Q}$ of the flip-flop circuit 63 to the bus utilization state signal line 12 and the AND gate 61. When the information handling unit Pm has completed the data transfer, the flip-flop circuit 63 is reset via an inverter 62 by interrupting the bus request signal on the line 65 from applying, and thereby a bus non-utilization signal (a "1"-level signal indicating an idle state of the common bus) is outputted from the output terminal Q.

Now the operation of the circuit shown in FIG. 4 will be described in greater detail.

First, in the case where the information handling unit Pm issues a bus request signal on the line 65 when another information handling unit is utilizing the common bus, there is present on the bus utilization state signal line 12 a "0"-level signal indicating a busy state of the bus, so that the output state of the AND gate 61 for making a decision on the availability of the bus is held at a "0"-level, and thus the bus request signal 65 cannot be accepted. Consequently, the gate unit 22 and the transmission gates $TR_5$ to $TR_8$ are not driven, and the internal bus 35 and the common bus 11 are kept uncoupled from each other so as not to hinder data transfer of another information handling unit.

Next, in the case where the bus request signal 65 is issued when no other information handling unit is utilizing the common bus 11, that is, when the bus utilization state signal line 12 is at a "1"-level, then the AND gate 61 outputs a bus available signal 67 (a "1"-level signal) which drives the gate unit 22, and thereby the own name address signal of the information handling unit Pm is outputted from the signal generator 21 to the decision unit 23 and the common bus 11. At this moment, if a different name address is not transmitted as a bus request signal from another information handling unit to the common bus 11, then the signals $B_1$, $B_2$, $B_3$ and $B_4$ inputted from the common bus 11 to the decision unit 23 would be identical to the signal components in the own name address signal decoded by the decoder. More particularly, to the input terminals of each of the EXCLUSIVE-NOR gates $XNOR_1$, $XNOR_2$, $XNOR_3$ and $XNOR_4$ in the decision unit 23 are inputted signals at the same level, and so, every one of the EXCLUSIVE-NOR gates outputs a "1"-level signal. These output signals are inputted to the AND gate 60 via the OR gates $OR_1$, $OR_2$, $OR_3$ and $OR_4$, respectively, and as a result, a name address coincidence signal (a "1"-level signal) is outputted from the AND gate 60. Accordingly, a "1"-level signal is outputted from the AND gate 64 which is connected to the AND gate 60. Thereby the flip-flop circuit 63 is set, and thus a bus grant signal 66 (a "1"-level signal) is outputted from its output terminal Q. Consequently, the transmission gates $TR_5$, $TR_6$, $TR_7$ and $TR_8$ are opened by the bus grant signal 66 to connect the internal bus 35 with the common bus 11, and then the information handling unit Pm can start data transfer through the common bus 11. On the other hand, from the output terminal Q of the flip-flop circuit 63 is outputted a bus busy signal (a "0"-level signal) onto the bus utilization state signal line 12 to inhibit utilization of the common bus 11 by another information handling unit, and the bus busy signal is also inputted to the AND gate 61 to disconnect the signal generator 21 from the common bus 11 by closing the transmission gates $TR_1$, $TR_2$, $TR_3$ and $TR_4$ in the gate unit 22. Thereafter, when the data transfer has been finished, the bus request signal 65 disappears and thereby the flip-flop circuit 63 is reset to output a bus utilization end signal (a "1"-level signal) from the output terminal $\overline{Q}$ onto the bus utilization state signal line 12. Then all the processings have been completed.

Now description will be made for the case where when a bus available signal 67 is outputted from the bus utilization procedure unit 20 and thereby a coded name address signal is outputted from the signal generator 21 to the common bus 11, a different name address signal or signals are simultaneously outputted from another information handling unit or other information handling units.

For convenience of explanation, as an aid for understanding, a table will be presented in the following description. It is to be noted that in the illustrated embodiment, one example of a circuit arrangement is shown in which a sequence of preference among four information handling units can be preset by providing two memories.

TABLE - 1

| No. | Memory Contents | Decoder Outputs | | | | Outputs of NAND gates $G_1 \sim G_4$ | | | |
|---|---|---|---|---|---|---|---|---|---|
| | | $M_1$ | $M_2$ | $M_3$ | $M_4$ | $G_1$ | $G_2$ | $G_3$ | $G_4$ |
| I | 1 , 1 | 0 | 1 | 1 | 1 | 1 | 1 | 1 | 1 |
| II | 1 , 0 | 1 | 0 | 1 | 1 | 0 | 1 | 1 | 1 |
| III | 0 , 1 | 1 | 1 | 0 | 1 | 0 | 0 | 1 | 1 |
| IV | 0 , 0 | 1 | 1 | 1 | 0 | 0 | 0 | 0 | 1 |

No. 1: An information handling unit in which the memory section 50 in signal generator 21 stores its own name address (1, 1);

As will be seen from TABLE-1, the decoder outputs $M_1$, $M_2$, $M_3$ and $M_4$ take the levels (0, 1, 1, 1) and thereby all the NAND gates $G_1$, $G_2$, $G_3$ and $G_4$ output "1", so that a bus grant signal 66 can be outputted unconditionally, whatever different signal may exist on the common bus. In other words, this information handling unit is the unit with the highest priority.

No. 2: An information handling unit in which the memory section 50 stores its own name address (1, 0);

The outputs of the NAND gates $G_2$, $G_3$ and $G_4$ become "1", and thereby the outputs of the OR gates $OR_2$, $OR_3$ and $OR_4$ also become "1", but the bus grant signal 66 cannot be issued unless the output of the EXCLUSIVE-NOR gate $XNOR_1$ becomes "1". More particularly, if its own decoder output signal "1" is present on the signal line $B_1$, then the output of the EXCLUSIVE-NOR gate $XNOR_1$ becomes "1", but if an information handling unit having a higher preference (an information handling unit having a memory content (1, 1))also outputs its name address signal onto the common bus 11, then on the signal line $B_1$ there appears a "0"-level signal, so that the decoder output signal $M_1$ transmitted from the No. 2 unit (a "1"-level signal) is overcome by the "0"-level signal, and thus the "0"-level signal is held on the signal line $B_1$. After all, a right for utilization of the common bus 11 can be granted to the No. 2 unit unless the No. 1 unit issues a bus request. In other words, the No. 2 unit has a second preference. Here it is to be noted that the illustrated embodiment is designed under the assumption that with regard to the signal levels outputted onto the common bus 11, the "0" level has a higher preference than the "1" level.

No. 3: An information hardling unit in which the memory section 50 stores its own name address (0, 1);

Since the NAND gates $G_3$ and $G_4$ output "1"-level signals, the decision made by the decision unit depends upon the signal levels on the signal lines $B_1$ and $B_2$ to be inputted to the EXCLUSIVE-NOR gates $XNOR_1$ and $XNOR_2$, respectively. That is, the No. 3 unit can be granted a right for utilization of the common bus 11 only when a "0" level signal is not present on either of the signal lines $B_1$ or $B_2$. In other words, the No. 3 unit has a third preference.

No. 4: An information handling unit in which the memory section 50 stores its own name address (0, 0);

Since only the NAND gate $G_4$ outputs a "1"-level signal, the No. 4 unit can be granted a right for utilization of the common bus 11 only when the three units having higher preferences do not issue a bus request signal. In other words, the No. 4 unit has the lowest preference of the four information units.

From the above description, it will be obvious that even if different name address signals are simultaneously outputted from a plurality of information units onto the common bus, the respective information units can make a decision, by themselves, on the utilization of the common bus according to a predetermined priority sequence.

While the illustrated embodiment was designed under the assumption that with regard to the signal levels of the name address signals outputted onto the common bus 11, the "0" level has a higher preference than the "1" level, now the operation principle for the "0" level preference will be explained in more detail with reference to FIG. 5.

Figure 5:
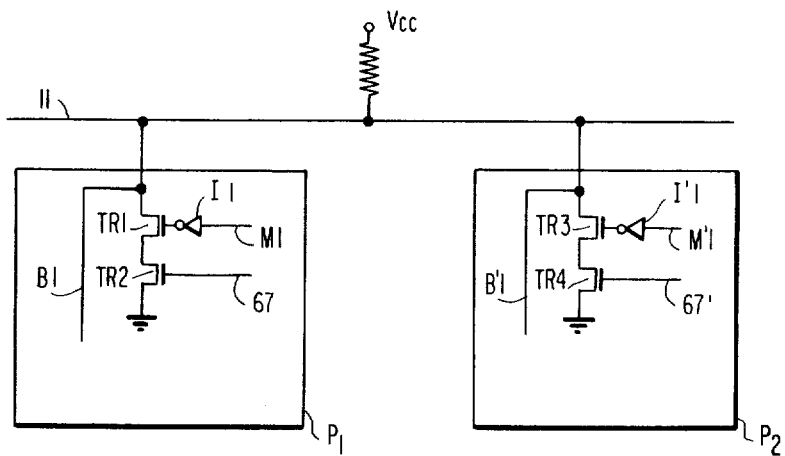
FIG. 5 shows one example of a gate circuit coupled to one signal line in a gate unit.

FIG. 5 shows one example in which two information handling units $P_1$ and $P_2$ transmit corresponding decoder output signals $M_1$ and $M_1'$, respectively, onto the same signal line in the common bus 11. In this example, transistors $T_{r1} \sim T_{r4}$ could be MOSFET's of the same conductivity type.

More particularly, in the case where in the unit $P_1$ a bus available signal 67 is generated and a decoder output signal $M_1$ at a "1" level is outputted from the signal generator and at the same time in the unit $P_2$ a decoder output signal $M_1'$ at a "0" level is outputted in response to generation of a bus available signal 67', then transistors $T_{r1}$ and $T_{r3}$ having the respective signal lines $M_1$ and $M_1'$ connected to their gate input electrodes via inverters $I_1$ and $I_1'$, respectively, are in a "cut-off" state and an "open" state, respectively so that the $V_{cc}$ level (a "1" level) applied to the common bus 11 via a resistor is dropped to a ground potential (a "0" level) through the transistors $T_{r3}$ and $T_{r4}$ in the unit $P_2$, and consequently a "0" level signal appears on both signal lines $B_1$ and $B_1'$.

In this way, with regard to each of the decoder output signals $M_1$, $M_2$, $M_3$ and $M_4$ outputted onto the common bus 11, a higher priority is placed on the "0"-level signal; therefore, signals are inputted to the decision unit 23 via the signal lines $B_1$, $B_2$, $B_3$ and $B_4$ on the basis of the above-described operation principle.

As will be apparent from the above description, according to the present invention, there is provided an information handling unit which can make a decision by itself on the state of utilization of the common bus and can achieve self-control on the basis of the results of the decision. This is accomplished separately providing a bus control unit for making a decision on the availability of the common bus 11 and simultaneously achieving control for utilization of the bus by the respective units or being given a bus control signal or timing signal from a particular unit so that the other units may obey the commands issued by that particular unit. A great advantage of such an information handling unit exists, as will be obvious from the above description, in that the information handling unit need not issue a bus request to any particular control unit when it wants to utilize the common bus because it possesses a bus control function by itself. Accordingly, in an information handling system including the plural information handling units in which operations are controlled with a predetermined timing, and especially in an information handling system employing such as a multi-processor system, an information handling unit can freely issue a bus request at any arbitrary time without waiting for the timing signal to select it. Also it can quickly achieve bus control. Especially in the illustrated embodiment, since the bus request can be accepted in the bus procedure unit only when the common bus is idle, an information handling unit can make a decision on the proprietary of the common bus utilization without necessitating any communication with the other information handling units. In addition, when the bus is idle, also the information handling unit can make a decision by itself on the utilization of the bus without transmitting any particular response signal to the other information handling units. Furthermore, since a timing signal is not necessary in such a series of procedures, the processing speed of the system can be greatly enhanced, and the time required before the information handling unit granted a right for utilization of the bus commences data transfer is extremely short. Still further, the circuit construction of the information handling unit for executing the above-mentioned operations can be made very simple, and thereby there is provided an information handling unit having great mass-producibility and versatility. As will be seen from the illustrated embodiment, in contrast to the fact that heretofore two signal lines were required upon issuing a bus request, the information handling unit according to the present invention requires only one bus utilization state signal line, and so, especially in case where the unit is made of a monolithic integrated circuit, it has a great advantage that the number of external terminals can be reduced.

While a comparison procedure was employed as a reference for a decision on the utilization of the common bus in the illustrated embodiment, this reference for decision can be established in an inherent manner, and any means can be employed so long as it has a capability of reading a signal inputted from the common bus and identifying whether or not the inputted signal is a signal for selecting that unit itself. In addition, while an example was shown in which the memory section in the signal generator consists of two name address memories, the memory section could be arbitrarily modified depending upon the number of information handling units. And in such modification, with regard to the circuit design, it is only necessary to modify the memory information in the memory section by re-programming, and the respective information handling units could have the same design pattern. Consequently, not only does the information handling unit have great massproducibility and versatility, but also it can be manufactured at an extremely low cost, upon assembling the respective units in a system their positioning can be freely chosen. Therefore, it is also an excellent effect of the present invention that it brings about great merits in the construction of the overall system.

In the illustrated embodiment, the information handling unit having the highest preference need not be provided with the decision unit, but it is only necessary to include the bus utilization procedure unit and to have a capability of outputting a "0"-level signal for overcoming the name address information of the other information handling units onto the common bus when the bus is available. In addition, in case the number of information handling units forming the system is small, the decoder for decoding the name address signal is not always necessary, but the name address signal might be delivered directly onto the common bus.

What is claimed is:

1. An information handling unit comprising:

a bus terminal coupled to a common signal bus for transferring and receiving an information signal to and from said common bus;

an internal signal bus;

an address signal generator generating an own name address signal;

a single control terminal coupled to a single control signal line separate from said common signal bus for transferring and receiving to and from said single control line a control signal indicating non-utilization of said common signal bus by an information handling unit;

a bus available signal generator directly coupled to said single control terminal and generating a bus available signal indicating availability of the common signal bus utilization in response to said control signal received from said single control terminal and when said information handling unit needs to utilize said common signal bus;

a gate coupled between said address signal generator and said bus terminal, said gate transferring said own name address signal to said bus terminal in response to said bus available signal generated by said bus available signal generator;

a transfer line connected to said bus terminal and transferring a name address signal received at said bus terminal;

a comparison means coupled to said address signal generator and said transfer line for comparing said own name address signal with said name address signal received via said transfer line;

means for generating a grant signal indicating grant of the common signal bus utilization in response to the result of a comparison in said comparison means; and a control signal generator generating the own control signal indicating non-utilization of said common signal bus by the own information handling unit when said grant signal is not generated, the output of said control signal generator being directly coupled to said single control terminal, whereby said single control signal line always indicates utilization or nonutilization condition of said common signal bus by any information handling unit, and said bus available signal generator always detects the condition of said single control signal line.

2. An information handling unit as claimed in claim 1, further comprising means for generating an end signal indicating that said unit has finished utilizing said common signal bus, said grant signal generating means ceasing to generate said grant signal in response to said end signal.

3. An information handling unit as claimed in claim 1, further comprising a control gate for electrically coupling said internal signal bus to said common signal bus via said bus terminal, said control gate being turned on in response to said grant signal.

4. An information handling unit as claimed in claim 3, in which said bus terminal is coupled to said address signal generator via said gate and to said transfer line, said transfer line being coupled to said comparison means and to said control gate connected to said internal signal bus.

5. An information handling unit as claimed in claim 1, further comprising means for generating an end signal indicating that said unit has finished utilizing said common signal bus and a control gate for electrically coupling said internal signal bus to said common signal bus via said bus terminal, in which said grant signal generating means and said control signal generator include a flip-flop circuit having set and reset portions and two output portions, said set portion being coupled to said comparison means, said reset portion being coupled to said end signal generating means, one of said two output portions being coupled to said control gate, and the other output portion being coupled to said single control terminal and to said bus available signal generator.

6. A data processing apparatus comprising:

a common signal bus terminal connected to a common signal bus for data transmission;

an internal signal bus;

an address signal generator generating an own name address signal, said generator including a register in which an own name address information is stored;

a gate means coupled to said common signal bus terminal and said address signal generator and transmitting said own name address signal to said common bus terminal;

a transmission line connected to said common signal bus terminal;

a decision means coupled to said address signal generator and said transmission line, and having a comparator comparing said own name address signal with a name address signal received at said common signal bus terminal and transmitted through said transmission line;

a bus request signal generator generating a request signal when said apparatus needs to utilize said common signal bus;

a flip-flop circuit having set and reset terminals and two output terminals, said set terminal being coupled to said decision means for reception of a result of a comparison in said comparator;

a control gate electrically coupling said internal signal bus to said transmission line and connected to one of said output terminals of said flip-flop circuit;

an external terminal coupled to one control signal line separate from said common signal bus for transferring and receiving a control signal indicating non-utilization of said common signal bus by a data processing apparatus to and from said one control signal line and directly connected to the other output terminal of said flip-flop circuit;

a bus available signal generator connected to said bus request signal generator and said external terminal and generating a bus available signal indicating availability of the common signal bus utilization when said control signal is received from said external terminal and said request signal is received from said request signal generator, said bus available signal turning on said gate means;

an end signal generator coupled to said reset terminal of said flip-flop circuit and generating an end signal indicating that the latter-mentioned data processing apparatus has finished utilizing said common signal bus, whereby said control signal is supplied to said one control signal line via said external terminal from said the other output terminal of said flip-flop circuit; and said comparator generating an allow signal when said address signal transmitted through said transmission line from common signal bus terminal is equal to said own name address signal, said flip-flop circuit being set by said allow signal and generating a grant signal from said one output terminal, said flip-flop circuit generating no control signal to said external terminal from said the other output terminal when said grant signal is generated through one output terminal, whereby said one control signal line always indicates utilization or non-utilization condition of said common signal bus by any apparatus, and said bus available signal generator always detects the condition of said one control signal line.

7. An apparatus as claimed in claim 6, in which said common signal bus terminal includes a plurality of bus terminals and said own name address signal includes a plurality of own name address bits, each of said own name address bits being coupled to corresponding said common signal bus terminals, respectively.

8. An apparatus as claimed in claim 7, further comprising a plurality of transmission lines connected to said common signal bus terminals and a plurality of comparators in said decision means, said plurality of comparators being coupled to said transmission lines, whereby a plurality of own name address signals are compared at the same time with a plurality of address signals received via said plurality of transmission lines.

9. A data processing system having a plurality of data processing units connected to each other by a common data bus, said data processing system comprising:

a single signal line coupled to said data processing units in common and transferring a control signal indicating non-utilization of said common data bus to said data processing units; and each said data processing unit including a common data bus terminal coupled to said common data bus, an address signal generator generating the own name address signal, a gate means coupled to said address signal generator and to said common data bus terminal, a transmission line connected to said common data bus terminal and transferring an address signal received at said bus terminal, a comparison means coupled to said address signal generator and said transmission line for comparing said own name address signal with said address signal received via said transmission line, a single control terminal connected to said single signal line separate from said common data bus for transferring and receiving said control signal, an internal signal bus, a common bus available signal generator directly coupled to said single control terminal and generating a bus available signal indicating availability of the common data bus utilization in response to said control signal from said single control terminal and when said unit needs to utilize said common data bus, a grant signal generator generating a grant signal indicating grant of the common data bus utilization in response to the result of a comparison in said comparison means, a control signal generator generating said control signal indicating non-utilization of said common data bus when said grant signal is not generated, the output of said control signal generator being directly coupled to said single control terminal, whereby said single signal line always indicates utilization or non-utilization condition of said common data bus by any data processing unit, and said bus available signal generator always detects the condition of said single control signal line.

* * * * *

UNITED STATES PATENT AND TRADEMARK OFFICE
CERTIFICATE OF CORRECTION

PATENT NO. : 4,271,465

DATED : June 2, 1981

INVENTOR(S) : Ohtsuka et al.

It is certified that error appears in the above—identified patent and that said Letters Patent is hereby corrected as shown below:

Column 5, line 8, delete "$P_2-P_n$" and insert -- $P_2, ---, P_n$ -- ;

line 10, delete "$10_2-10_n$" and insert -- $10_2, ---, 10_n$ -- ;

line 18, delete "$10_2-10_n$" and insert -- $10_2, ---, 10_n$ -- .

Column 6, line 31, delete "and" before "a buffer" .

Column 7, line 10, delete "Q" and insert -- $\bar{Q}$ -- ;

line 59, delete "Q" and insert -- $\bar{Q}$ -- .

Signed and Sealed this

Twenty-second Day of September 1981

[SEAL]

Attest:

Attesting Officer

GERALD J. MOSSINGHOFF

Commissioner of Patents and Trademarks